United States Patent [19]

Kim

[11] Patent Number: 4,807,821
[45] Date of Patent: Feb. 28, 1989

[54] METHOD FOR WINDING COILS OF SINGLE-PHASE INDUCTION ELECTROMOTOR

[76] Inventor: In S. Kim, #10-615 Samig Apt., 134-21 Cheong-dam-Dong, Kang-nam-ku, Seoul, Rep. of Korea

[21] Appl. No.: 50,471
[22] Filed: May 18, 1987
[51] Int. Cl.⁴ .................. H02K 3/00; H02K 15/085
[52] U.S. Cl. ................................ 242/7.03; 310/184
[58] Field of Search ............ 242/1.1 R, 1.1 A, 1.1 E, 242/7.03, 7.07; 310/180, 184, 198, 203, 204, 205, 206, 207; 29/596

[56] References Cited

U.S. PATENT DOCUMENTS

| | | | |
|---|---|---|---|
| 1,566,939 | 12/1925 | Welch | 310/180 |
| 1,894,724 | 1/1933 | Apple | 310/198 X |
| 2,367,079 | 1/1945 | Wiest | 310/180 |
| 2,615,944 | 10/1952 | Carlson | 310/198 X |
| 2,795,712 | 6/1957 | Suhr | 310/198 |
| 3,235,762 | 2/1966 | Brammerlo | 310/198 X |
| 3,809,937 | 5/1974 | Koike | 310/184 |
| 4,013,909 | 3/1977 | Broadway et al. | 310/180 |
| 4,462,859 | 7/1984 | Nakamura | 310/206 X |

FOREIGN PATENT DOCUMENTS 903485 12/1953 Fed. Rep. of Germany ... 242/1.1 R

Primary Examiner—Stuart S. Levy
Assistant Examiner—Joseph J. Hail, III
Attorney, Agent, or Firm—Birch, Stewart, Kolasch & Birch

[57] ABSTRACT

A method for winding stator coils of a single phase induction electromotor comprising winding a starting coil, avoiding winding of the starting coil about selected slots, moving an outer coil pitch to form coil overlapping slots adjacent to the selected unused slots for eliminating unused teeth, whereby the starting coil overlaps the starting coil in the selected slots disposed in a starting winding with a 90° electric angle for increasing the starting torque and promoting the operation efficiency of the electromotor.

1 Claim, 4 Drawing Sheets

METHOD FOR WINDING COILS OF SINGLE-PHASE INDUCTION ELECTROMOTOR

FIELD OF THE INVENTION

The present invention relates to a method for winding coils of single-phase induction electromotor and, in particular, to a method for winding coils of single-phase induction electromotor designed to promote operation efficiency and to improve starting torque by eliminating unused teeth between unused slots and coil overlapping slots in a starting winding, while keeping a 90° electric angle is formed between the starting winding and main winding.

DESCRIPTION OF THE PRIOR ART

Generally, in many type of single-phase 4-polar induction electromotors, four unused teeth are existent between poles adjacent to main winding slots or between poles adjacent to starting winding slots and, in main winding, a magnetic flux produced from these unused teeth during operation does not rotate the rotor of electromotor but exercises a damping action on it due to counter electromotive force.

Consequently, in the prior single-phase induction electromotor, in order to remove such unused teeth between poles adjacent to the main winding slots, an adjacent pole and its outer coil loop are wound in the same slot by one-slot expansion of coil pitch and by expansion of each coil loop of each pole.

An example of such prior art main winding is illustrated in FIG. 1. In the single-phase 4-polar 36-slot induction electromotor, each coil pitch of coil C1 spans 1st slot to 10th slot, 2nd slot to 9th slot, 3rd slot to 8th slot and 4th slot to 7th slot and an outer coil path of coil C2 which forms an adjacent pole spans 10th slot to 19th slot. Consequently, 10th slot is jointly owned by the coil C1 and the outer coil pitch of coil C2. Thus, unused teeth are not existent.

However, although it is the best way to wind a coil in the same manner as in the main winding in order to remove the unused teeth in the starting winding, an electric angle formed between the starting winding and the main winding cannot maintain a 90° in the single-phase 4-polar induction electromotor. Therefore, there is no other way but to wind a coil in the starting winding so that the unused teeth may exist between respective adjacent poles.

Thus such prior art induction electromotor is defective because the entire operation efficiency may drop by reducing its starting torque.

SUMMARY OF THE INVENTION

Accordingly, the present invention is designed in consideration of such prior art defects as described hereinabove. It maintains a 90° electric angle between the main winding and starting winding by moving only an outer coil pitch of coil formed each pole of starting winding to coil overlapping slots adjacent to unused slots of the starting winding, and eliminates the unused teeth from the starting winding for improving starting torque.

BRIEF DESCRIPTION OF THE DRAWINGS

When a detailed explanation is given to it according to the drawings attached hereto, it comes as follows.

DESCRIPTION OF THE PREFERRED EMBODIMENTS

Figure 1:
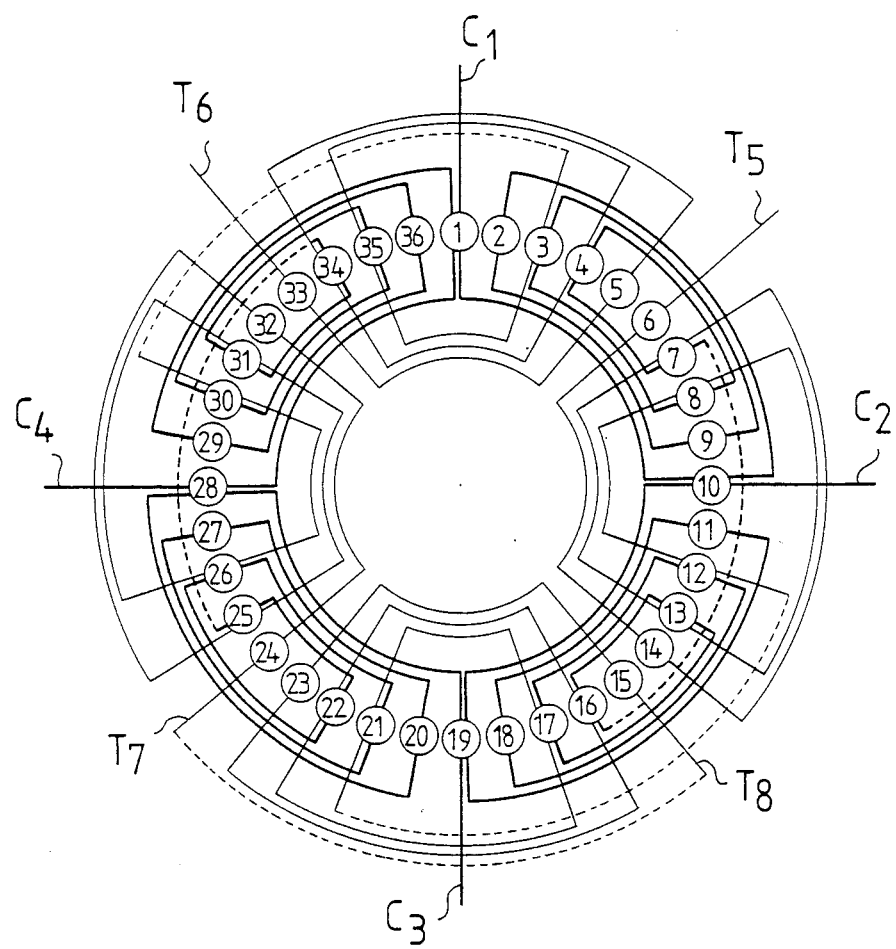
FIG. 1 is a schematic diagram of a prior art single-phase 4-polar induction electromotor showing wound coils.
Figure 2:
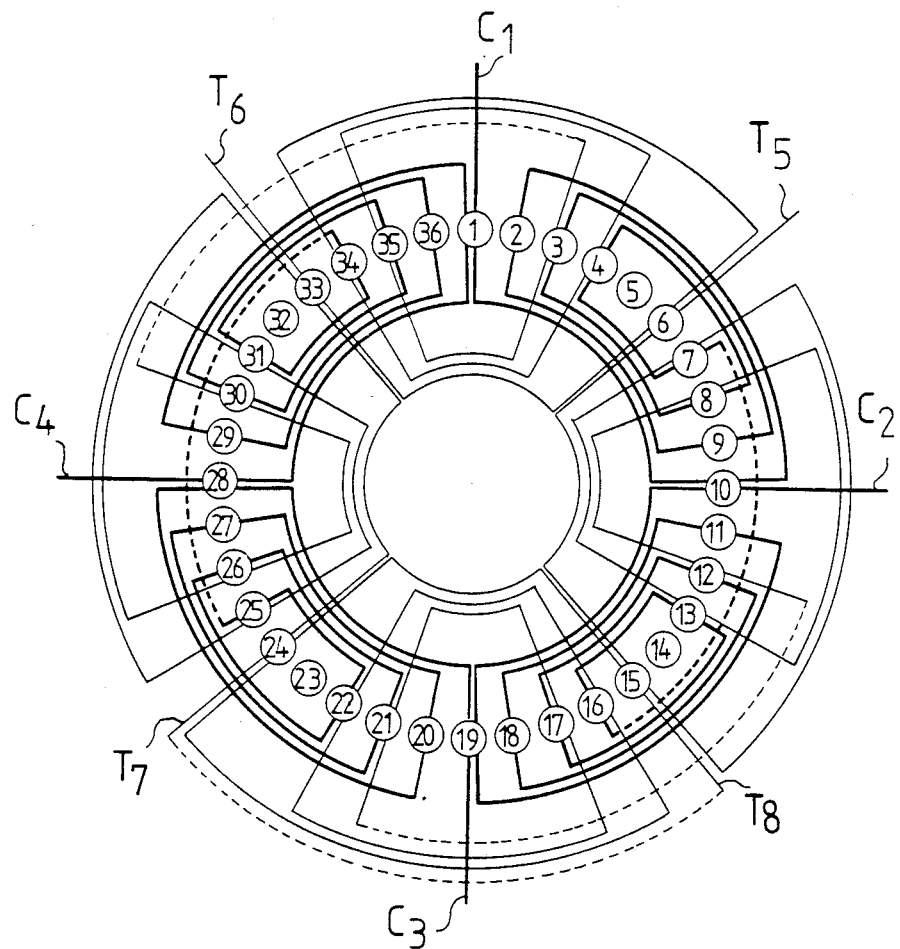
FIG. 2 is a schematic diagram of an electromotor the present invention showing wound coils.
Figure 3:
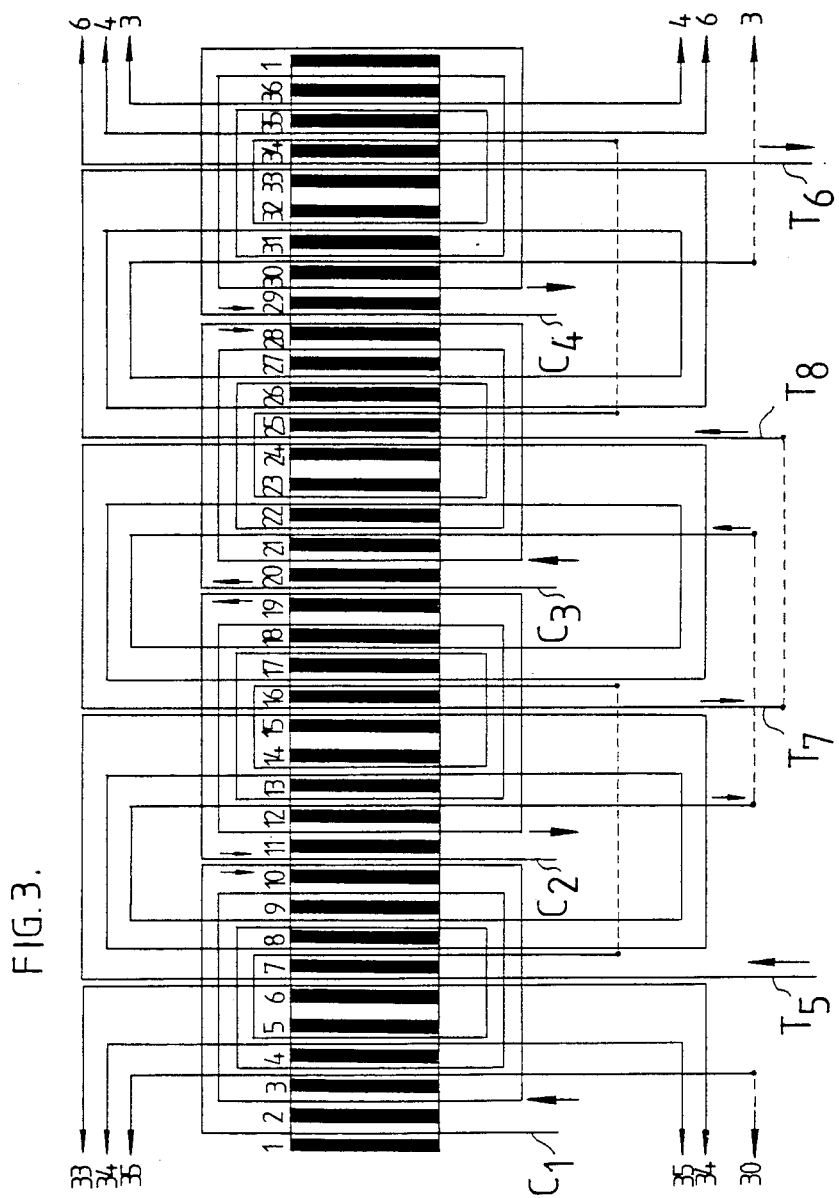
FIG. 3 is a development diagram showing the stator slots of the present invention.
Figure 4:
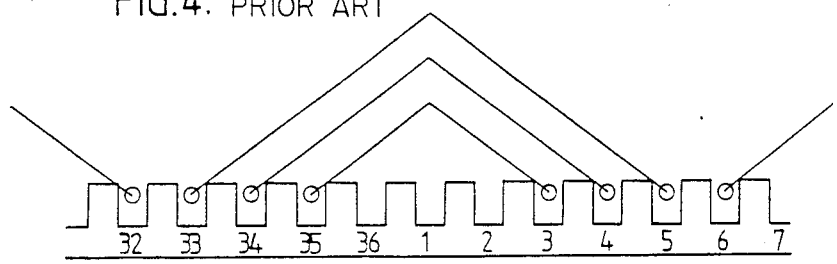
FIGS. 4 and 5 are diagrams showing a simple comparison drawn between prior art (FIG. 4) and the present invention (FIG. 5), respectively.
Figure 5:
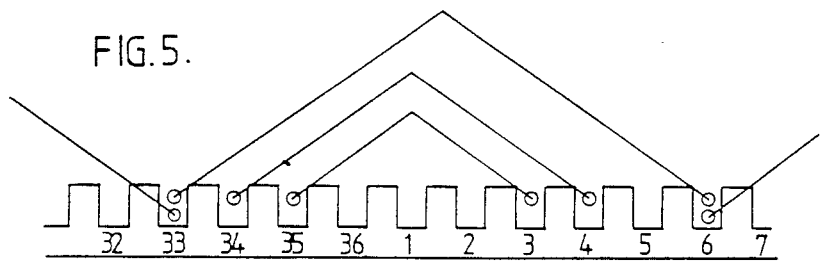

FIG. 2 is a summarized diagram showing that a main winding and a starting winding are wound through slots according to the present invention. It shows that all coil pitches of each pole are moved by one slot so that the main winding does not form unused teeth between respective poles formed by coils C1, C2, C3 and C4.

At this time, the starting winding is provided with a 90° electric angle disposed between the main winding and the starting winding without changing a size of an electric angle of the center of each pole formed by coils T5, T6, T7 and T8. However outer coil pitch slots, for example, 6th slot, 15th slot, 24th slot and 33rd slot, are owned jointly by the adjacent poles without the unavailable teeth between adjacent poles by moving an outer coil pitch of each coil T5–T8 outwardly to coil overlapping slots adjacent to unused slots of the starting wind. Accordingly, the electric angle of the pole center of an inner coil pitch of each pole of starting winding is coincident with that of the pole center of the outer coil pitch of the starting winding by offsetting by 5° in the 4-pole 36-slot induction electromotor of the present invention.

The single-phase induction electromotor of the present invention removes the unavailable teeth by one-slot movement of only outer coil pitch of each pole and improves starting torque, thereby promoting the entire operation efficiency thereof.

What is claimed is:

1. A method for winding stator coils of a single phase 4-pole 36-slot induction electromotor comprising:

winding a starting coil through slots of said electromotor for forming a starting winding, avoiding winding of said starting coil about selected slots, said selected slots being unused slots, moving an outer coil pitch to form coil overlapping slots adjacent to said selected unused slots for eliminating unused teeth between said unused slots and said coil overlapping slots, and winding a main coil through slots for forming a main winding whereby the starting coil overlaps the starting coil in said selected slots, a 90° electric angle being formed between said main winding and said starting winding, and four slots being unused by the starting winding for effectively increasing the starting torque and promoting the operation efficiency of the electromotor.

* * * * *